(12) United States Patent
Frye et al.

(10) Patent No.: US 9,519,610 B2
(45) Date of Patent: Dec. 13, 2016

(54) SMARTPHONE DOCK REMINDER FOR VEHICLES

(71) Applicant: General Motors LLC, Detroit, MI (US)

(72) Inventors: Mark S. Frye, Grosse Pointe Woods, MI (US); Lawrence D. Cepuran, Northville, MI (US); Steven Swanson, Commerce Township, MI (US); Charles A. Everhart, Canton, MI (US)

(73) Assignee: GENERAL MOTORS LLC, Detroit, MI (US)

( * ) Notice: Subject to any disclaimer, the term of this patent is extended or adjusted under 35 U.S.C. 154(b) by 882 days.

(21) Appl. No.: 13/870,702

(22) Filed: Apr. 25, 2013

(65) Prior Publication Data

US 2014/0325113 A1 Oct. 30, 2014

(51) Int. Cl.
*G06F 13/00* (2006.01)
*G06F 13/40* (2006.01)

(52) U.S. Cl.
CPC ........... *G06F 13/4081* (2013.01); *G06F 13/00* (2013.01)

(58) Field of Classification Search
USPC ........................................ 710/300, 303, 304
See application file for complete search history.

(56) References Cited

U.S. PATENT DOCUMENTS

2008/0266089 A1* 10/2008 Haren et al. ............... 340/568.1
2012/0214408 A1* 8/2012 Chronister ................... 455/26.1
2013/0151111 A1* 6/2013 Skelton ........................... 701/99

* cited by examiner

*Primary Examiner* — Khanh Dang
(74) *Attorney, Agent, or Firm* — Leydig, Voit & Mayer, Ltd.

(57) ABSTRACT

A system and method for reminding a user to dock a mobile device in a docking apparatus within a vehicle are provided. A docking apparatus includes: one or more sensors for determining whether an object is present in the docking apparatus; and at least one of speakers, a vibration mechanism, and one or more display indicators for reminding a user to place the mobile device in the docking apparatus when the one or more sensors determine that an object is not present in the docking apparatus. A system includes the docking apparatus and a mobile device. The method includes receiving an indication that the vehicle ignition is turned on; determining whether the mobile device is in a docking apparatus; and reminding the user to dock the mobile device in the docking apparatus.

16 Claims, 5 Drawing Sheets

SMARTPHONE DOCK REMINDER FOR VEHICLES

FIELD

The present disclosure relates generally to vehicle communications systems and more specifically to a smartphone docking apparatus and reminding users to dock their smartphones.

BACKGROUND

Telematics units within mobile vehicles provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit is utilized to provide a subscriber with the telematics services.

As smartphone use has become more and more prevalent among the general population, a variety of applications have been developed that allow users to monitor and control their vehicles from their smartphones. For example, a user can install a smartphone application that allows the user to remotely start the vehicle's ignition, check fuel levels, unlock doors, and perform a variety of other functions with respect to the vehicle. Furthermore, smartphones often include functionality that is helpful to a user while the user is driving—e.g., Global Positioning System (GPS) technology that allows the user to obtain driving directions and view the vehicle location on a display. Smartphones may be used in combination with or as a replacement for services provided through a vehicle's telematics unit.

The above body of information is provided for the convenience of the reader. The foregoing is a discussion of problems discovered and/or appreciated by the inventors, and is not an attempt to review or catalog the prior art.

SUMMARY

Implementations of the present invention contemplate reminding a user to dock a mobile device, such as a smartphone, in a docking apparatus. In one implementation, the present invention provides a docking apparatus for holding a mobile device during operation of a vehicle. The docking apparatus includes: one or more sensors for determining whether an object is present in the docking apparatus; and at least one of speakers, a vibration mechanism, and one or more display indicators for reminding a user to place the mobile device in the docking apparatus when the one or more sensors determine that an object is not present in the docking apparatus.

In another implementation, the present invention provides a system for reminding a user to dock a mobile device during operation of a vehicle. The system includes: the mobile device; and a docking apparatus, configured to hold the mobile device during vehicle operation. The docking apparatus further includes: one or more sensors for determining whether an object is present in the docking apparatus, In another further implementation, the present invention provides a method for reminding a user to dock a mobile device during operation of a vehicle. The method includes: receiving, by a docking apparatus, an indication that the vehicle ignition is turned on; determining, by the docking apparatus, whether the mobile device is in the docking apparatus; reminding, by the docking apparatus, the user to dock the mobile device in the docking apparatus by performing at least one of the following: causing a sound to be played to the user, causing the mobile device or the docking apparatus to vibrate, and causing a reminder to be displayed to the user.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

In general terms, not intended to limit the scope of the invention, implementations of the present invention contemplate reminding a user to dock a mobile device, such as a smartphone, in a docking apparatus within a vehicle. As users often use their mobile devices for driving-related functions such as requesting directions, docking the mobile device encourages safer driving by allowing the user to utilize those driving-related functions without looking away from the windshield, assuming the docking apparatus is conveniently positioned on the dashboard. For example, in certain implementations, if the user receives a phone call on the mobile device, the user simply reaches up and presses answer (or vocally commands the phone or telematics unit to answer), and the docked mobile phone can facilitate the call over speaker phone or through the vehicle telematics system.

Figure 1:
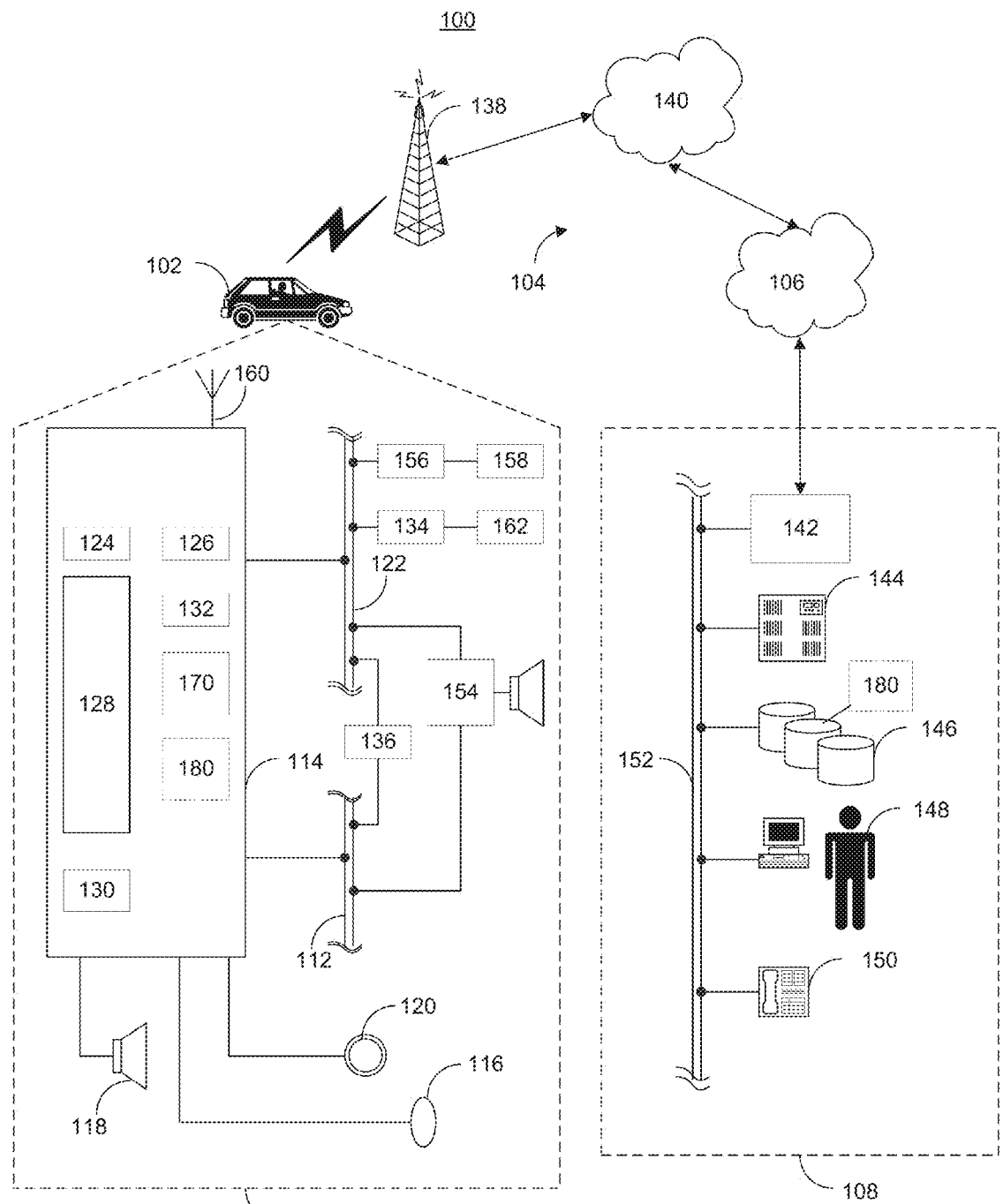
FIG. 1 is a schematic diagram of an operating environment for a mobile vehicle communication system usable in implementations of the described principles.

Before going into the details of specific exemplary implementations of the present invention, an exemplary environment suitable for certain implementations is described hereinafter. It will be appreciated that the described environment is an example, and does not imply any limitation regarding the use of other environments. With reference to FIG. 1 there is shown an example of a communication system 100 that is used with the present method and system and generally includes a vehicle 102, a wireless carrier system 104, a land network 106 and a call center 108. It should be appreciated that the overall architecture, setup and operation, as well as the individual components of a system such as that shown here are generally known in the art, Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few, The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 is called the network access device (NAD) of the telematics unit 114. The NAD 114 further includes a short-range wireless unit 170 capable of communicating with a user's mobile device such as a cellular phone, tablet computer, PDA, or the like, over a short-range wireless protocol. For example, in one implementation, the short-range wireless unit 170 is a Bluetooth unit with an RF transceiver that communicates with a user's mobile device using Bluetooth protocol. It will be appreciated that other short-range wireless communication technologies other than Bluetooth may be used in other implementations, The telematics unit 114 provides too many services to list them all, but several examples include: turn-by-turn directions and other navigation-related services provided in conjunction with the OPS based chipset/component 132; airbag deployment notification and other emergency or roadside assistance-related services provided in connection with various crash and or collision sensor interface modules 156 and sensors 158 located throughout the vehicle.

Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications use radio transmissions to establish a communications channel with wireless carrier system 104 so that both voice and data transmissions can be sent and received over the communications channel. Vehicle communications are enabled via the cellular chipset/component 124 for voice communications and a wireless modem 126 for data transmission.

In order to enable successful data transmission over the communications channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal. or other auditory commands, and can be equipped with an embedded voice processing unit utilizing a human/machine interface (IMO technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech.

The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 contains a speaker system or utilizes speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is (preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center includes a remote data server.

As appreciated by those skilled in the art, various cell tower/base station/MSC arrangements are possible and could be used with wireless system 104 (also referred to as the "cellular network" herein). For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

It will be appreciated by those of skill in the art that the execution of the various machine-implemented processes and steps described herein occur via the computerized execution of computer-executable instructions stored on a tangible computer-readable medium, e.g., RAM, ROM, PROM, volatile, nonvolatile, or other electronic memory mechanism. Thus, operations performed by the telematics unit, the call center, and/or a user's mobile device are carried out according to stored instructions or applications stored on a computer-readable medium in each respective entity.

Figure 2:
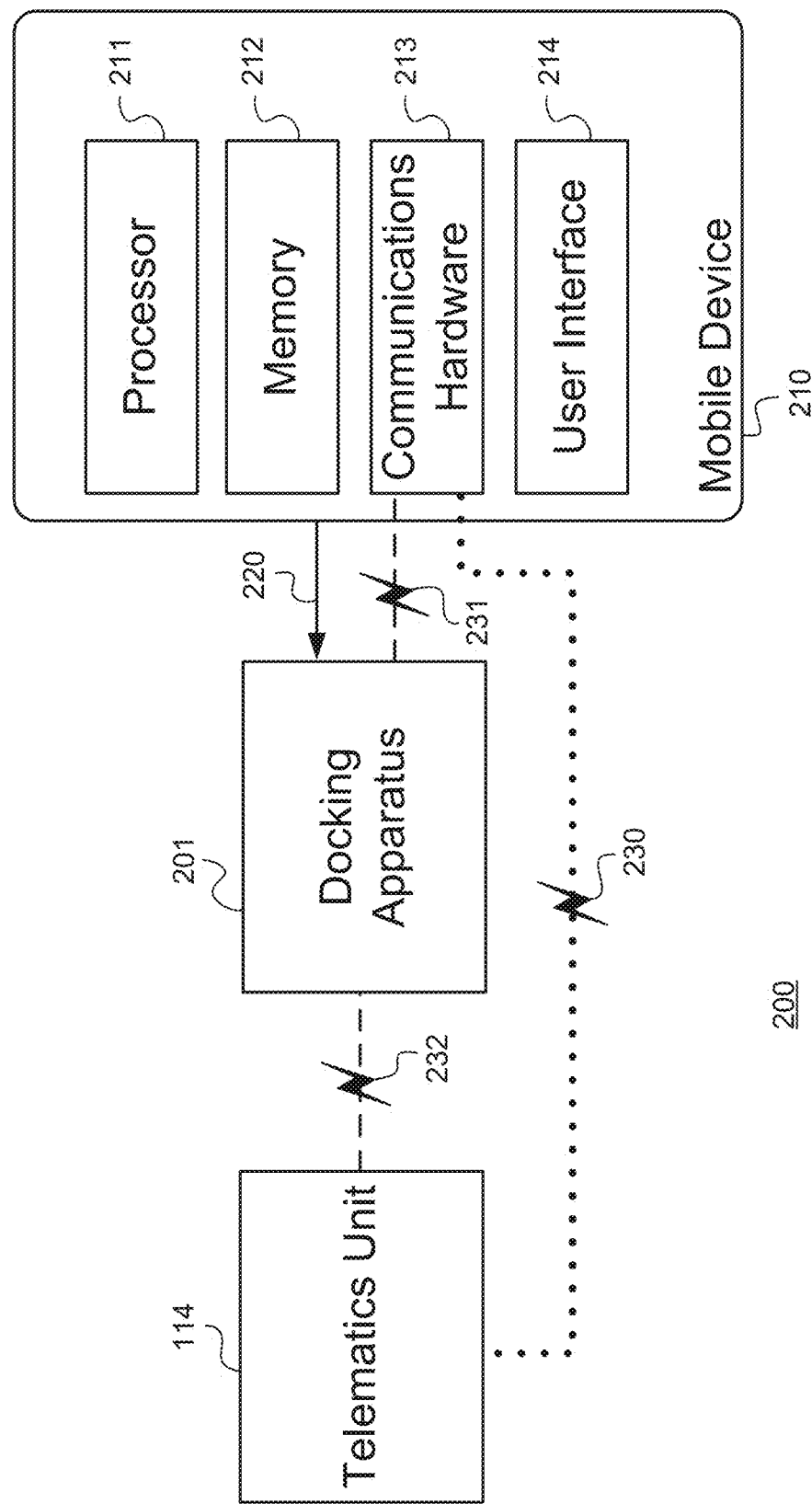
FIG. 2 is a block diagram illustrating the general architecture of a mobile device and its connections with a docking apparatus and telematics unit in accordance with various implementations of the described principles.

With further reference to the exemplary architecture of FIG. 1, a block diagram 200 is depicted in FIG. 2 that illustrates the general architecture of a mobile device and its connections with a docking apparatus 201 and telematics unit 114 in accordance with various implementations of the described principles. In an exemplary implementation, the mobile device 210 includes a processor 211, one or more memories 212, communications hardware 213, and a user interface 214. A user interacts with the mobile device 210 through the user interface 214, which includes input/output components such as buttons and/or a touchscreen display. The mobile device 210 communicates with communications network 104 via appropriate communications hardware 213. The communications hardware 213 further includes short-range wireless communication hardware for facilitating communications according to short-range wireless protocols such as Bluetooth. Additionally, the mobile device 210 includes computer-executable instructions and applications stored at one or more memories 212, which are executed by the processor 211.

In one exemplary implementation, the docking apparatus 201 does not communicate with the mobile device 210 or the telematics unit 114. The mobile device 210 is placed into the docking apparatus 201 (shown by element 220 in FIG. 2), but there is no electronic connection between the docking apparatus 201 and the telematics unit 114 or between the docking apparatus 201 and the mobile device 210 (depicted by elements 232 and 231 in FIG. 2). For example, the docking apparatus 201 includes a sensor to determine whether a mobile device 210 has been placed in the docking apparatus 201, and so long as the sensor does not detect the mobile device 210 in the docking apparatus 201, a battery-powered display indicator (e.g., an LED indicator) continually blinks to remind the user to place the mobile device 210 into the docking apparatus 201. In this implementation, the communications hardware 213 of the mobile device 210 communicates directly with the telematics unit 114 via a short-range wireless communications link 230. It will be appreciated that, in a further exemplary implementation, the connection 230 between the telematics unit and the communications hardware 213 of the mobile device 210 is achieved by a wired connection that is plugged into the mobile device 210. In another further exemplary implementation, the docking apparatus 201 is connected to and receives power from the vehicle battery rather than from a battery within the docking apparatus 201.

In another exemplary implementation, the mobile device 210 communicates with the telematics unit 114 via a short-range wireless communications link 230, but the docking apparatus 201 also includes electronic connections between the docking apparatus 201 and the telematics unit 114 or between the docking apparatus 201 and the mobile device 210 (depicted by elements 232 and 231 in FIG. 2). For example, the docking apparatus 201 provides a charging interface through which the mobile device 210 receives electronic charging through a connection 231 capable of transferring power to the mobile device 210. In another example, the docking apparatus 201 provides an electronic communications channel between the telematics unit and the mobile device 210 along connections 231 and 232 that allows the mobile device 210 to utilize the audio components of the telematics unit 114 (e.g., for carrying out a hands-free call) along a wired connection (231 and 232) rather than along the connection 230. In yet another example, the docking apparatus 201 receives signals from the telematics unit 114 indicating when the vehicle has been turned on and determines whether to remind the user to dock the mobile device 210. In an alternative example, the docking apparatus 201 is controlled by the telematics unit 114, and the telematics unit 114 determines whether to use the docking apparatus 201 (and/or use the mobile device 210) to remind the user to dock the mobile device 210 depending on feedback from a sensor of the docking apparatus 201.

In yet another further exemplary implementation, the mobile device 210 does not communicate directly with the telematics unit 114 along connection 230, but instead communicates with the telematics unit 114 via the docking apparatus 201 along connections 231 and 232 when the mobile device 210 is docked shown by the arrow 220). This allows the mobile device 210 to conserve resources by instead utilizing the functionality of the telematics unit 114 (e.g., for facilitating calls, providing navigation directions, etc.), and obviates the need to use the short-range wireless hardware in both the telematics unit 114 and the mobile device 210 to communicate.

Figure 3:
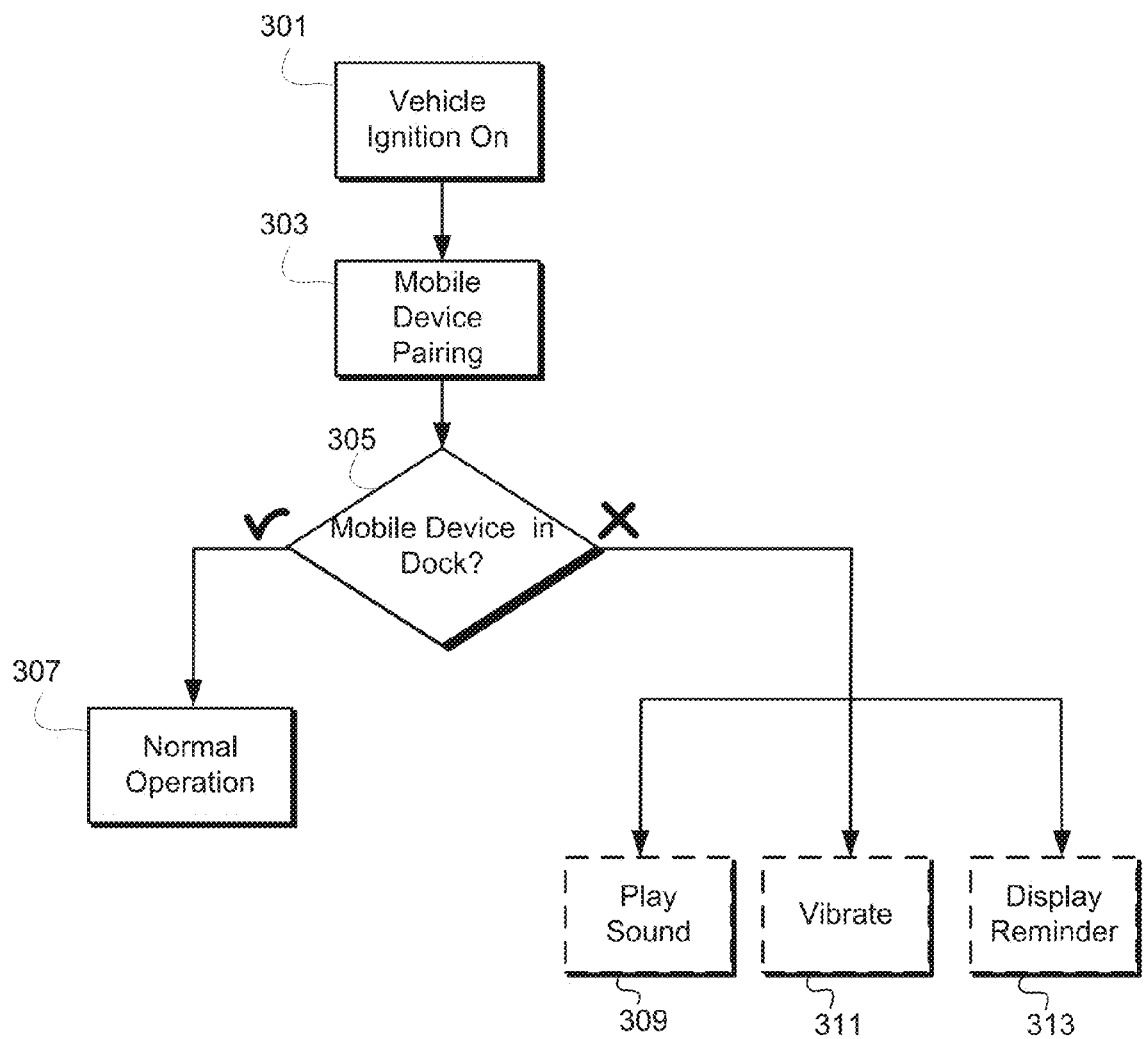
FIG. 3 is a flowchart illustrating a process for reminding a user to dock a mobile device in the docking apparatus in accordance with an implementation of the described principles.

Turning now to FIG. 3, an exemplary process 300 involving a vehicle telematics unit is depicted for reminding a user to dock a mobile device in the docking apparatus. At stage 301 the vehicle ignition is turned on, and at stage 303 the user's mobile device is paired with the telematics unit of the vehicle, for example, via a Bluetooth pairing. If the mobile device is in the docking apparatus at stage 305, there is no need for a reminder and the telematics unit and mobile device proceed with normal operation at stage 307. In a further implementation, the telematics unit and/or the mobile device confirm to the user that the mobile device has properly been docked, for example, by way of an audio message or a displayed notification on the docking apparatus or the mobile device. If the mobile device is not in the docking apparatus at stage 305, either the docking apparatus or the mobile device reminds the user to place the mobile device in the docking apparatus by at least one of playing a sound at stage 309, vibrating at stage 311, and displaying a reminder at stage 313.

Various implementations of the docking apparatus have different degrees of functionality, and some implementations rely on the mobile device to remind the user to dock a paired mobile device, while other implementations utilize the docking apparatus itself to remind the user to dock a paired mobile device. For example, in one implementation, the docking apparatus includes speakers, a vibration mechanism, and an indicator light. After the vehicle ignition is turned on at stage 301, the mobile phone is paired with the telematics unit at stage 303, and the docking apparatus or telematics unit (by way of one or more sensors at the docking apparatus) detects that the mobile device is not in the docking apparatus at stage 305, the docking apparatus plays a sound through its speakers at stage 309, vibrates at stage 311, and/or causes the indicator light to blink at stage 313. In another implementation, the sound played at stage 309 is played through the vehicle speakers, and the reminder displayed to the user at stage 313 is shown on a display associated with the vehicle telematics unit. In yet another further implementation, it is the mobile device that plays the sound at stage 309, vibrates at stage 311, and/or displays a reminder on a display associated with the mobile device at stage 313.

In one implementation, at stage 305, when the telematics unit or the docking apparatus determines whether or not a mobile device is in the docking apparatus, the telematics unit further determines whether the mobile device in the docking apparatus is the same as the mobile device that it paired with at stage 303. For example, if the telematics unit paired with one mobile device but some other mobile device or object was placed in the docking apparatus, identification data along a connection between the mobile device and the telematics unit (e.g., a non-wireless connection via the docking apparatus) is used to verify that the mobile device in the docking apparatus is the same as the mobile device that was paired with the telematics unit at stage 303. If it is determined that the mobile device or object in the docking apparatus is not the same device as was previously paired with the telematics unit, the user is notified via an audio sound at stage 309, vibration at stage 311, and/or a displayed reminder at stage 313 (such as a blinking light or error message). In other implementations, this verification is not performed, and so long as a sensor at the docking apparatus indicates that a mobile device has been docked in the docking apparatus, the condition at stage 305 is determined to be satisfied and no reminder is performed.

It will be appreciated that certain implementations, such as the example described above where a battery-powered LED on the docking apparatus continually blinks when no mobile device is docked in the docking apparatus, do not require detection of the vehicle ignition being on at stage 301 or the mobile device pairing at stage 303.

Figure 4:
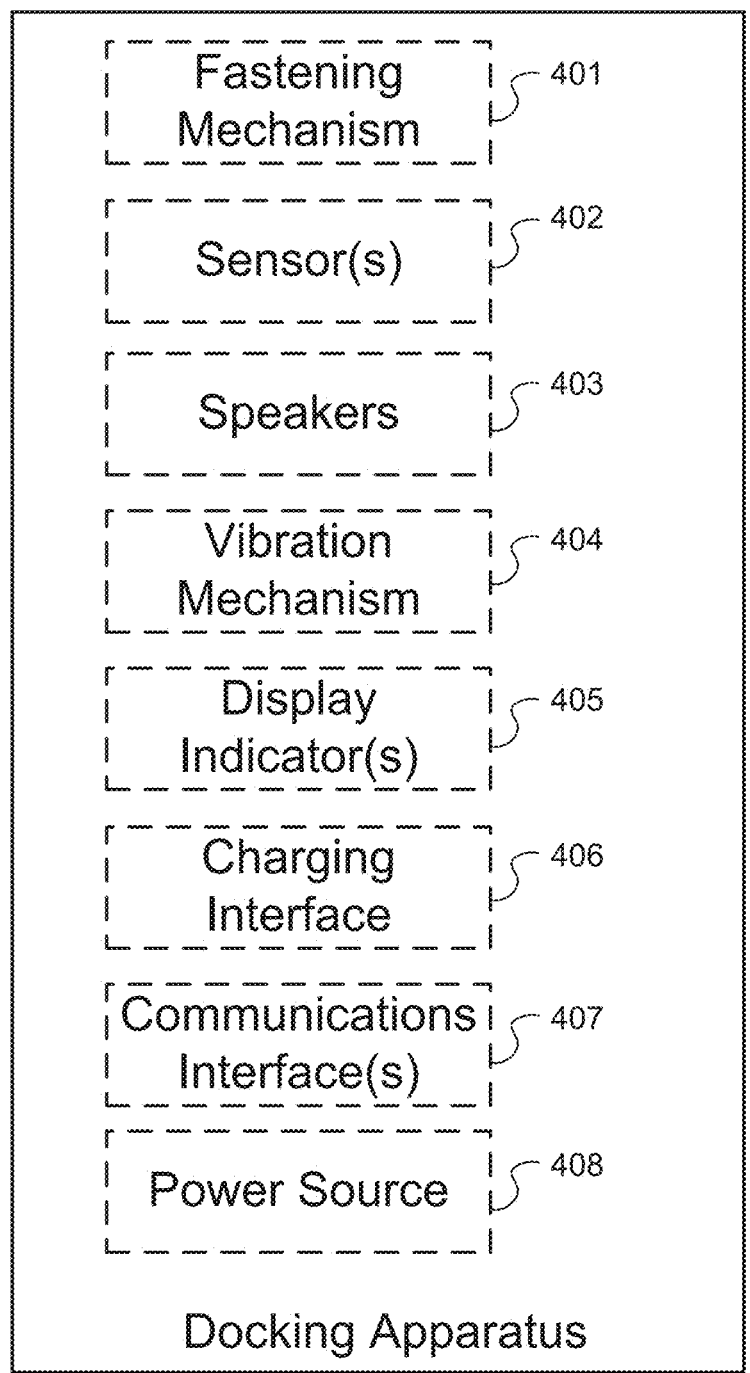
FIG. 4 is a block diagram illustrating the components of a docking apparatus in accordance with an implementation of the described principles.

In accordance with the above-described principles, FIG. 4 depicts a block diagram 400 of the components of the docking apparatus 201 in an exemplary implementation where the docking apparatus 201 provides a broad array of functionality to a user's smartphone. It will be appreciated that other implementations of the docking apparatus 201 include more or less components (e.g., a basic implementation includes only the docking apparatus 201).

The docking apparatus 201 is configured to hold a mobile device in place, whether securely or loosely. In certain implementations, the docking apparatus 201 is shaped as a cradle or includes protrusions that allow a mobile device to be placed in the docking apparatus 201 without falling out during vehicle operation. In further implementations, the docking apparatus 201 includes a fastening mechanism 401 (e.g., such as a mechanical structure that snaps a mobile device into a secure position, a sticky or friction-creating surface that helps the mobile device stay in place, a plug that can be received into one of the inputs of the mobile device, etc.).

The docking apparatus 201 further includes one or more sensors 402 (such as pressure-detection sensors or light-sensitive sensors) that detect whether or not an object is present. The determination by the one or more sensors is utilized by circuitry at the docking apparatus 201 or is communicated through a communications interface 407 (such as an electronic connection) to the telematics unit or to the mobile device so that an appropriate reminder (via the telematics unit, docking apparatus, and/or mobile device) is presented to the user if necessary. In certain implementations, a plug that can put the telematics unit into communication with a mobile device placed in the docking apparatus 201 can also act as a sensor 402. In such implementations, other sensors would be unnecessary as the telematics unit is able to determine whether or not a mobile device is present in the docking device through the plug. In a further implementation, the communications interface 407 includes a short-range wireless device capable of communicating with a mobile device over a short-range wireless protocol.

The docking apparatus 201 further includes speakers 403, a vibration mechanism 404 (e.g., a motor attached to an off-center weight or other mechanisms for causing vibration in a device), and/or one or more display indicators 405 that are used to remind the user to dock a mobile phone in the docking apparatus 201 as described above with respect to FIG. 3.

Additionally, the docking apparatus 201 optionally includes a charging interface 406 through which the vehicle battery is used to charge the mobile device, and one or more communications interfaces 407 used to communicate with the mobile device and/or the telematics unit. In another implementation where the docking apparatus 201 is not powered by the vehicle battery, the docking apparatus 201 includes its own power source 408, such as a battery, for providing power to perform the above-described reminder functions.

It will be appreciated that in implementations where the docking apparatus 201 performs functions such as determination of whether the vehicle ignition is on and determining whether to remind the user to dock a mobile device based on signals from the one or more sensors, the docking apparatus 201 further includes appropriate hardware and/or software for carrying out those functions, such as a memory for storing computer-executable instructions and a processor for executing those instructions.

In an alternative implementation, the above-described telematics unit environment is not needed, and the docking apparatus and mobile device are used in an environment with a vehicle that is not equipped with a telematics unit. In this implementation, the docking apparatus includes electronic interfaces with the mobile device and the vehicle such that the phone can be charged using the vehicle as a power source. Further, the docking apparatus is connected to the vehicle bus so that when the vehicle is turned on, the docking apparatus reminds the user to dock the mobile device as described above when it detects that the mobile device is not present in the docking apparatus.

In a further implementation, the docking apparatus includes a short-range wireless communications interface that is used to pair with a mobile device after the vehicle ignition is turned on. In this implementation, the docking apparatus verifies whether an object present in the docking apparatus is the mobile device that it paired with upon vehicle ignition, and as described above, if the object present in the docking apparatus is not the paired mobile device, the docking apparatus and/or the mobile device notify the user that an incorrect object is in the docking apparatus.

Figure 5:
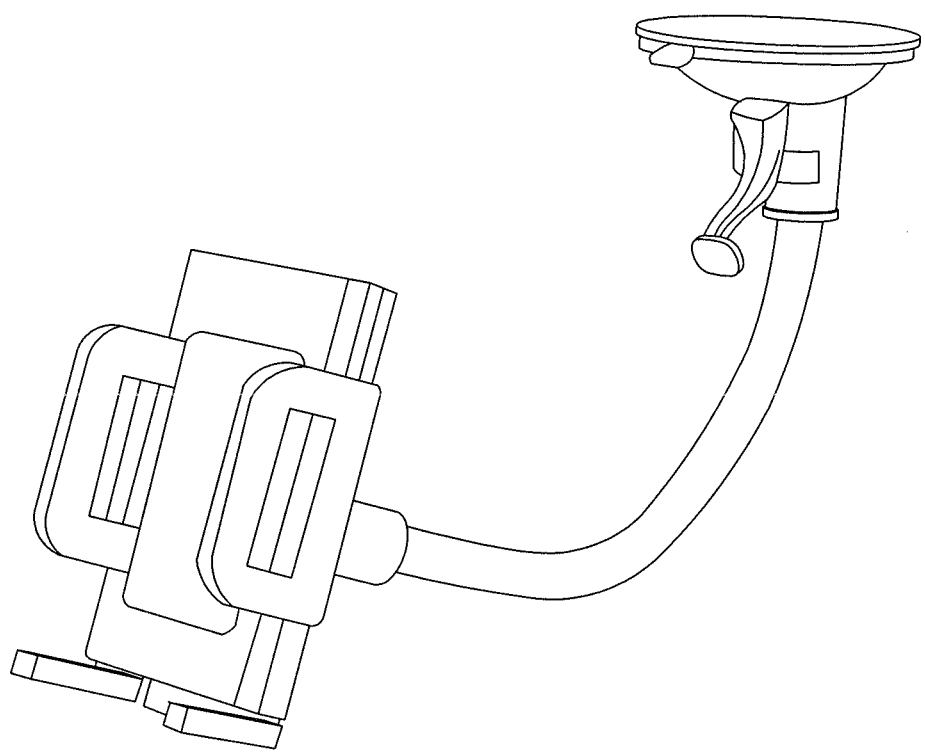
FIG. 5 provides an exemplary design for the structure of the docking apparatus in accordance with an implementation of the described principles.

FIG. 5 provides an exemplary illustration 500 of the structure of the docking apparatus according to one exemplary implementation. In this example, the docking apparatus is shaped so as to form a cradle in which the mobile device may be placed, as well as including a suction cup for attachment to a vehicle surface. Electronic components and connections are not depicted in this exemplary illustration.

It is thus contemplated that other implementations may differ in detail from foregoing examples. As such, all references to the invention are intended to reference the particular example of the invention being discussed at that point in the description and are not intended to imply any limitation as to the scope of the invention more generally. A language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A docking apparatus for holding a mobile device during operation of a vehicle, the docking apparatus comprising:
   one or more sensors, configured to detect whether the mobile device is present in the docking apparatus;
   an output device from the group consisting of speakers, a vibration mechanism, and one or more display indicators, the output device being configure to provide a reminder to a user to place the mobile device in the docking apparatus;
   a communication interface, configured to communicate with a telematics unit of the vehicle to receive an indication from the telematics unit that the vehicle ignition is started; and
   a processor; and
   a non-transitory, computer-readable medium having processor-executable instructions stored thereon that, when executed by the processor, facilitate the docking apparatus performing a method including;
      determining, based on the one or more sensors and the indication received from the telematics unit, that the vehicle ignition was started without the mobile device being placed in the docking apparatus; and
      causing, in response to determining that the vehicle ignition was started without the mobile device being placed in the docking apparatus, the output device to provide a reminder to the user to place the mobile device in the docking apparatus.

2. The docking apparatus of claim 1, further comprising:
   a fastening mechanism for securing the mobile device in the docking apparatus.

3. The docking apparatus of claim 1, further comprising:
   a charging interface for providing power to a battery of the mobile device while the mobile device is in the docking apparatus.

4. The docking apparatus of claim 1, further comprising:
   one or more communication interfaces configured to establish a connection with at least one mobile device.

5. The docking apparatus of claim 1, further comprising:
   a power source for providing power to the at least one of speakers, a vibration mechanism, and one or more display indicators.

6. The docking apparatus of claim 1, wherein the docking apparatus is shaped as a cradle so as to hold the mobile device in the docking apparatus while allowing a user to interact with a display of the mobile device.

7. A system for reminding a user to dock a mobile device during operation of a vehicle, the system comprising:
   telematics unit of the vehicle; and
   a docking apparatus, configured to hold the mobile device, the docking apparatus further comprising:
      one or more sensors, configured to detect whether the mobile device is present in the docking apparatus;
      an output device, configured to provide a reminder to a user to place the mobile device in the docking apparatus;

a communication interface, configured to communicate with the telematics unit to receive an indication from the telematics unit that the vehicle ignition is started;

a processor; and a non-transitory, computer-readable medium having processor-executable instructions stored thereon that, when executed by the processor, facilitate the docking apparatus performing a method including:

determining, based on the one or more sensors and the indication received from the telematics unit, that the vehicle ignition was started without the mobile device being placed in the docking apparatus; and causing, in response to determining that the vehicle ignition was started without the mobile device being placed in the docking apparatus, the output device to provide a reminder to the user to place the mobile device in the docking apparatus.

8. The system of claim 7, wherein the docking apparatus and the mobile device are configured to communicate using a short-range wireless protocol.

9. The system of claim 7, wherein the docking apparatus further comprises one or more communication interfaces for communicating with the mobile device.

10. The system of claim 7, wherein the docking apparatus and the mobile device are configured to pair with one another.

11. The system of claim 10, wherein the docking apparatus is further configured to verify whether mobile device in the docking apparatus is the paired mobile device.

12. A method for reminding a user to dock a mobile device during operation of a vehicle in a docking apparatus having one or more sensors, an output device, a communications interface, a processor, and a non-transitory computer-readable medium, the method comprising:

receiving, by the docking apparatus, an indication that the vehicle ignition is started from a telematics unit of the vehicle via the communication interface of the docking apparatus;

determining, by the docking apparatus, whether the mobile device is in the docking apparatus based on the one or more sensors of the docking apparatus;

determining, by the docking apparatus, based on the one or more sensors and the indication received from the telematics unit, that the vehicle ignition was started without the mobile device being placed in the docking apparatus; and reminding, by the docking apparatus, in response to determining that the vehicle ignition was started without the mobile device being placed in the docking apparatus, the user to dock the mobile device in the docking apparatus by performing at least one of the following: causing a sound to be played to the user, causing the mobile device or the docking apparatus to vibrate, and causing a reminder to be displayed to the user.

13. The method of claim 12, wherein the sound is played by at least one of speakers of the vehicle, speakers of the docking apparatus, and speakers of the mobile device.

14. The method of claim 12, wherein causing the reminder to be displayed to the user further comprises at least one of: displaying a message to the user through the mobile device and utilizing a display indicator on the docking apparatus.

15. The method of claim 12, further comprising:

pairing the docking apparatus with the mobile device over a short-range wireless protocol.

16. The method of claim 15, wherein determining whether the mobile device is in the docking apparatus further comprises:

verifying that the mobile device in the docking apparatus is the mobile device that was paired with the docking apparatus.

* * * * *